(12) United States Patent
Morishita et al.

(10) Patent No.: US 11,285,848 B2
(45) Date of Patent: Mar. 29, 2022

(54) ARMREST OF VEHICLE SEAT

(71) Applicant: TOYOTA BOSHOKU KABUSHIKI KAISHA, Aichi-ken (JP)

(72) Inventors: Kentaro Morishita, Aichi-ken (JP); Kazuhiro Iio, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/950,521

(22) Filed: Nov. 17, 2020

(65) Prior Publication Data

US 2021/0155132 A1  May 27, 2021

(30) Foreign Application Priority Data

Nov. 22, 2019  (JP) .............................. JP2019-211111

(51) Int. Cl.
  *B60N 2/70*  (2006.01)
  *B60N 2/75*  (2018.01)
  *B60N 3/10*  (2006.01)

(52) U.S. Cl.
  CPC ............. *B60N 2/757* (2018.02); *B60N 2/767* (2018.02); *B60N 2/793* (2018.02); *B60N 3/102* (2013.01)

(58) Field of Classification Search
  CPC ........ B60N 2/757; B60N 2/767; B60N 2/793; B60N 3/102
  USPC ....................................................... 297/113
  See application file for complete search history.

(56) References Cited

U.S. PATENT DOCUMENTS

| 9,981,585 B2 * | 5/2018 | Attala ................... B60N 2/763 |
| 2009/0008982 A1 * | 1/2009 | Langensiepen ........ B60N 2/757 |
| | | 297/411.32 |

FOREIGN PATENT DOCUMENTS

| EP | 0670241 A1 * | 9/1995 | ............. B60N 2/757 |
| JP | 2014172538 | * 9/2014 | |
| JP | 2015-182563 A | 10/2015 | |
| JP | 2015182562 | * 10/2015 | |
| JP | 2017081193 | * 5/2017 | |
| JP | 2018-118586 A | 8/2018 | |

* cited by examiner

*Primary Examiner* — Mark R Wendell
(74) *Attorney, Agent, or Firm* — Greenblum & Bernstein, P.L.C.

(57) ABSTRACT

An armrest of a seat for a vehicle includes a first armrest that is movable between a storage position where the first armrest constitutes a part of a seating surface of a seat back and a use position where the first armrest abuts against and is supported on a seating surface of a seat cushion, a rear end portion of the first armrest in the use position being connected to a lower portion of the seat back to be rotatable forward and backward about a first rotation axis extending in a lateral direction of the seat, and a second armrest that is connected to the first armrest to be interlocked with the first armrest, is close to a rear side of the first armrest in the storage position, and is separated upward from the first armrest in the use position.

7 Claims, 10 Drawing Sheets

ARMREST OF VEHICLE SEAT

CROSS REFERENCE TO RELATED APPLICATIONS

This application is based on Japanese Patent Applications No. 2019-211111 filed on Nov. 22, 2019, the entire contents of which are incorporated herein by reference.

TECHNICAL FIELD

The present disclosure relates to an armrest of a vehicle seat.

BACKGROUND ART

A known armrest is rotatable relative to a seat back of a rear seat of a vehicle seat. JP-A-2018-118586 discloses an armrest capable of swinging forward and backward about a rotation shaft provided in a lower portion of the seat back between a storage position in which the armrest is stored in a seat back and a use position in which the armrest is laid down forward a seat. In the storage position in which the armrest is stored in a recess provided in a widthwise middle portion of the seat back, a front surface side of the armrest constitutes a portion of a seat surface of the seat back. In the use position in which the front surface side is abutted against a seat surface of a seat cushion, a rear surface side in the storage position becomes substantially horizontal so that an arm of a seated person may be supported comfortably.

JP-A-2015-182563 also discloses an armrest capable of swinging forward and backward about a rotation shaft provided in a lower portion of the seat back between a storage position in which the armrest is stored in a seat back and a use position in which the armrest is laid down forward a seat. When the armrest is in the use position with a reduced thickness and an operation lever attached thereto, a rear surface side of the armrest is substantially horizontal by protruding the operation lever downward to be abutted against a seat surface of a seat cushion.

When the armrest disclosed in JP-A-2018-118586 is in the use position and the rear surface side in the storage position is substantially horizontal to comfortably support the arm of the seated person, the thickness of the armrest is increased and the armrest is larger, which may easily lead to an increase in weight. In the armrest disclosed in JP-A-2015-182563, although an increase in weight of the armrest is prevented, the operation lever which is a hard member appears on a front surface side constituting a portion of a seating surface of the seat back, which may lead to deterioration of the comfort of the seat back.

Given such problems, an object of the present disclosure is to provide an armrest of a vehicle seat that is rotatable relative to a seat back and prevents an increase in weight while maintaining the comfort of use.

SUMMARY OF INVENTION

According to a first aspect of the present disclosure, an armrest of a seat for a vehicle includes:

a first armrest that is movable between a storage position where the first armrest constitutes a part of a seating surface of a seat back and a use position where the first armrest abuts against and is supported on a seating surface of a seat cushion, a rear end portion of the first armrest when the first armrest is in the use position being connected to a lower portion of the seat back to be rotatable forward and backward about a first rotation axis extending in a lateral direction of the seat; and a second armrest that is connected to the first armrest to be interlocked with the first armrest, is close to a rear side of the first armrest when the first armrest is in the storage position, and is separated upward from the first armrest in the use position, an upper surface of the second armrest serving as an armrest surface for a seated person that extends in a substantially horizontal direction in the use position.

According to the first aspect, the second armrest is close to the rear side of the first armrest in the storage position of the first armrest and is separated upward from the first armrest in the use position of the first armrest, so as to implement a function of the armrest. In this manner, the armrest can be compactly stored while maintaining the comfort of use and accordingly, the substantial volume of the entire armrest can be reduced and an increase in weight can be prevented.

In a second aspect of the present disclosure according to the first aspect, the second armrest is connected to the first armrest so that a rear end portion of the second armrest in the use position is rotatable forward and backward about a second rotation axis provided above the first rotation axis and extending in parallel to the first rotation axis, and the armrest further comprises a first link member that has two end portions connected to the first armrest and the second armrest to be rotatable about a third rotation axis and a fourth rotation axis, the third rotation axis being provided on a front end portion of the first armrest in the use position and parallel to the first rotation axis, the fourth rotation axis being provided on a front end portion of the second armrest in the use position and parallel to the second rotation axis.

According to the second aspect, the seat back, the first armrest, the second armrest, and the first link member constitute a four-bar link. Since this structure requires only the first link member in addition to the first armrest and the second armrest, the second armrest can be interlocked to the first armrest with a simple structure.

In a third aspect of the present disclosure according to the first aspect, the second armrest is connected to the first armrest so that a front end portion of the second armrest in the use position is rotatable about a fifth rotation axis provided on a front end portion of the first armrest and extending in parallel to the first rotation axis, and the armrest further comprises a second link member that has two end portions connected to the first armrest and the second armrest, one of the end portions being rotatably connected to the first rotation axis of the first armrest, the other of the end portions being slidably connected to an elongated hole provided on a rear end portion of the second armrest in the use position, the elongated hole extending substantially in a front-rear direction of the seat.

According to the third aspect, this structure requires only the second link member in addition to the first armrest and the second armrest. Accordingly, the second armrest can be interlocked to the first armrest with a simple structure.

In a fourth aspect of the present disclosure according to the second aspect or the third aspect, the first armrest includes a protruding portion that protrudes and extends forward from a front end portion of the upper surface of the second armrest in a plan view of the vehicle when the first armrest is in the use position.

According to the fourth aspect, the protruding portion is not covered from above by the second armrest in the use position. Accordingly, the protruding portion is effectively used as a cup holder or a small container.

In a fifth aspect of the present disclosure according to the fourth aspect, a storage space is formed on the protruding portion.

According to the fifth aspect, a distance between the storage space and the seated person is kept even if the compact structure of the armrest is adopted. That is, the seated person's hands are not cramped.

DESCRIPTION OF EMBODIMENTS

Figure 1:
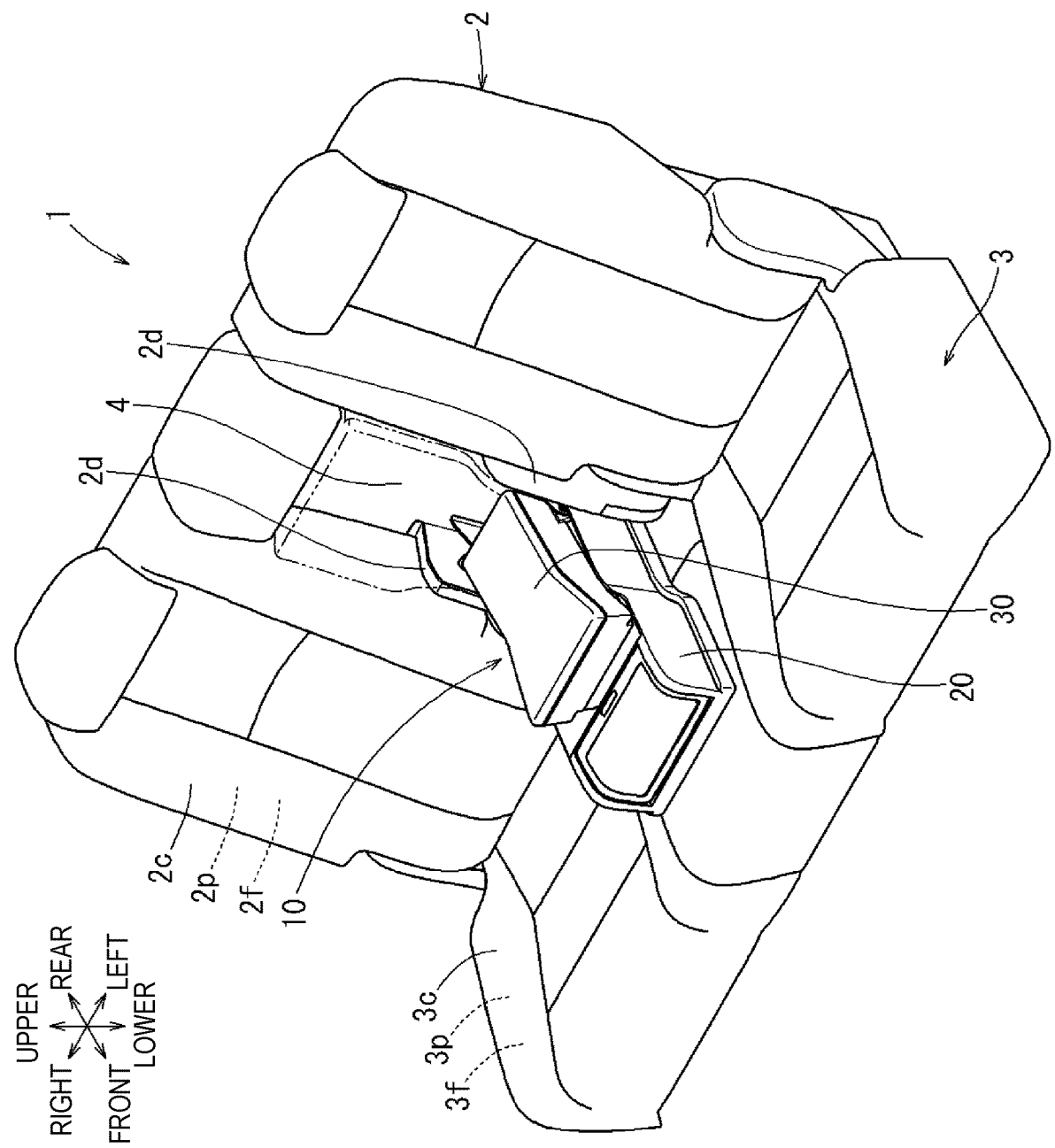
FIG. 1 is a perspective view of an automobile rear seat as viewed from an oblique front side, to which an armrest according to a first embodiment of the present disclosure is attached. A solid line indicates a state in which the armrest is in a use position, and a two-dot chain line indicates a state in which the armrest is in a storage position.

FIGS. 1 to 5 illustrate a first embodiment of the present disclosure. The first embodiment shows an example in which the present disclosure is applied to an armrest 10 attached to a seat back 2 of an automobile rear seat 1. In the drawings, directions when the automobile rear seat 1 is attached to an automobile are indicated by arrows. In the following description, descriptions of directions are made with reference to these directions. The automobile rear seat 1 including the seat back 2 to which the armrest 10 according to the present embodiment is attached is a bench seat and includes a seat cushion 3 serving as a seating portion and the seat back 2 serving as a backrest. The automobile rear seat 1 is attached to an automobile body. Here, the automobile rear seat 1 corresponds to "vehicle seat" in the claims.

As illustrated in FIG. 1, the seat cushion 3 includes a cushion frame 3f constituting a framework, a cushion pad 3p that is a cushion member, and a cushion cover 3c that is a cover member. The seat back 2 includes a back frame 2f constituting a framework, a back pad 2p that is a cushion member, and a back cover 2c that is a cover member. A storage recess 4 that stores the armrest 10 when the armrest 10 is not in use is provided in a middle portion in a left-right direction of the seat back 2. The armrest 10 has a use position indicated by a solid line in which the armrest 10 is placed on the seat cushion 3 and a storage position indicated by a two-dot chain line in which the armrest 10 is stored in the storage recess 4.

As illustrated in FIGS. 2 to 5, the armrest 10 includes a lower armrest 20, an upper armrest 30 provided on the lower armrest 20, and a link member 40 coupling the lower armrest 20 with the upper armrest 30. Here, the lower armrest 20, the upper armrest 30, and the link member 40 respectively correspond to "first armrest", "second armrest", and "first link member" in the claims.

Figure 4:
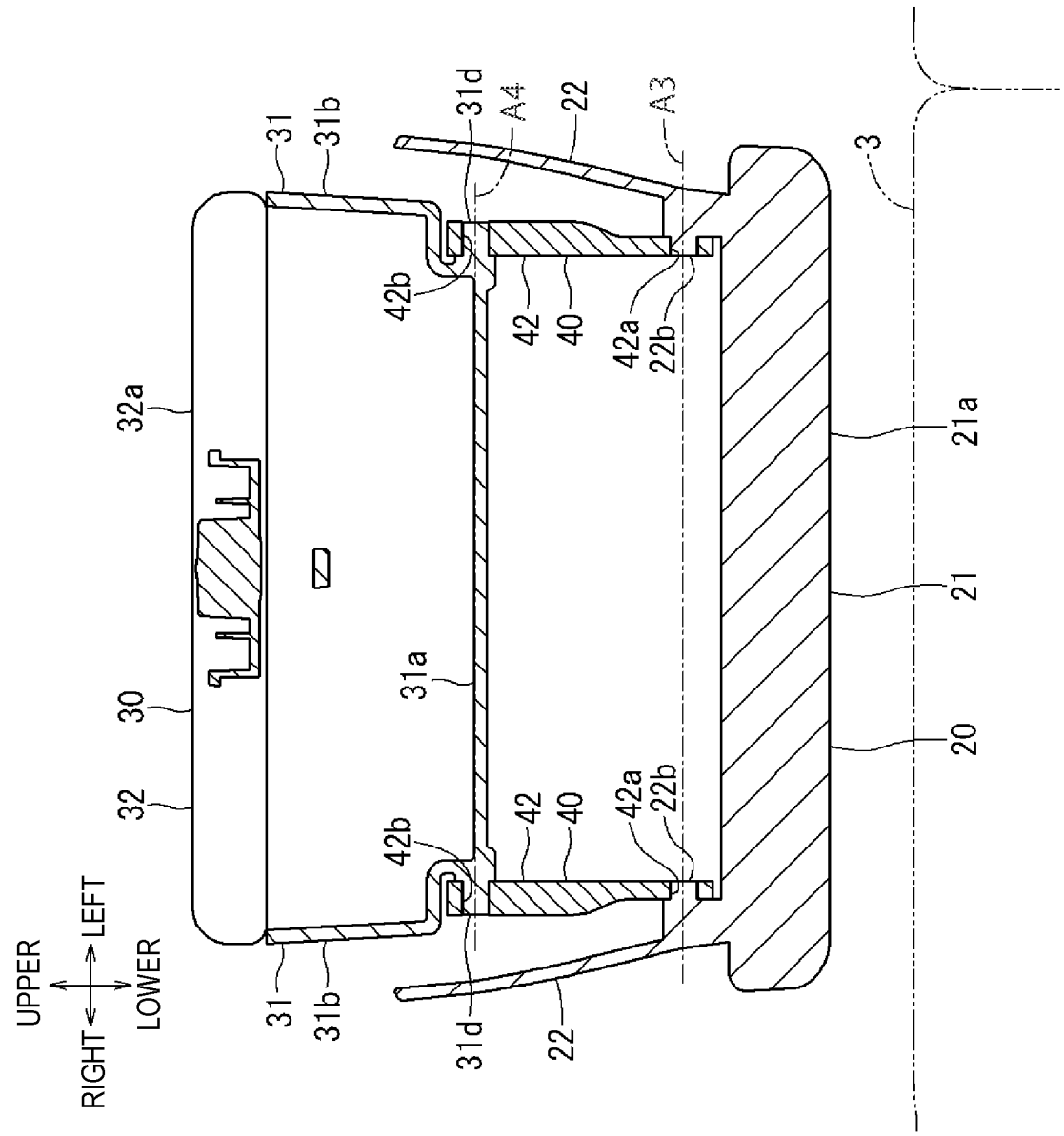
FIG. 4 is a sectional view taken along a line IV-IV in FIG. 2.
Figure 5:
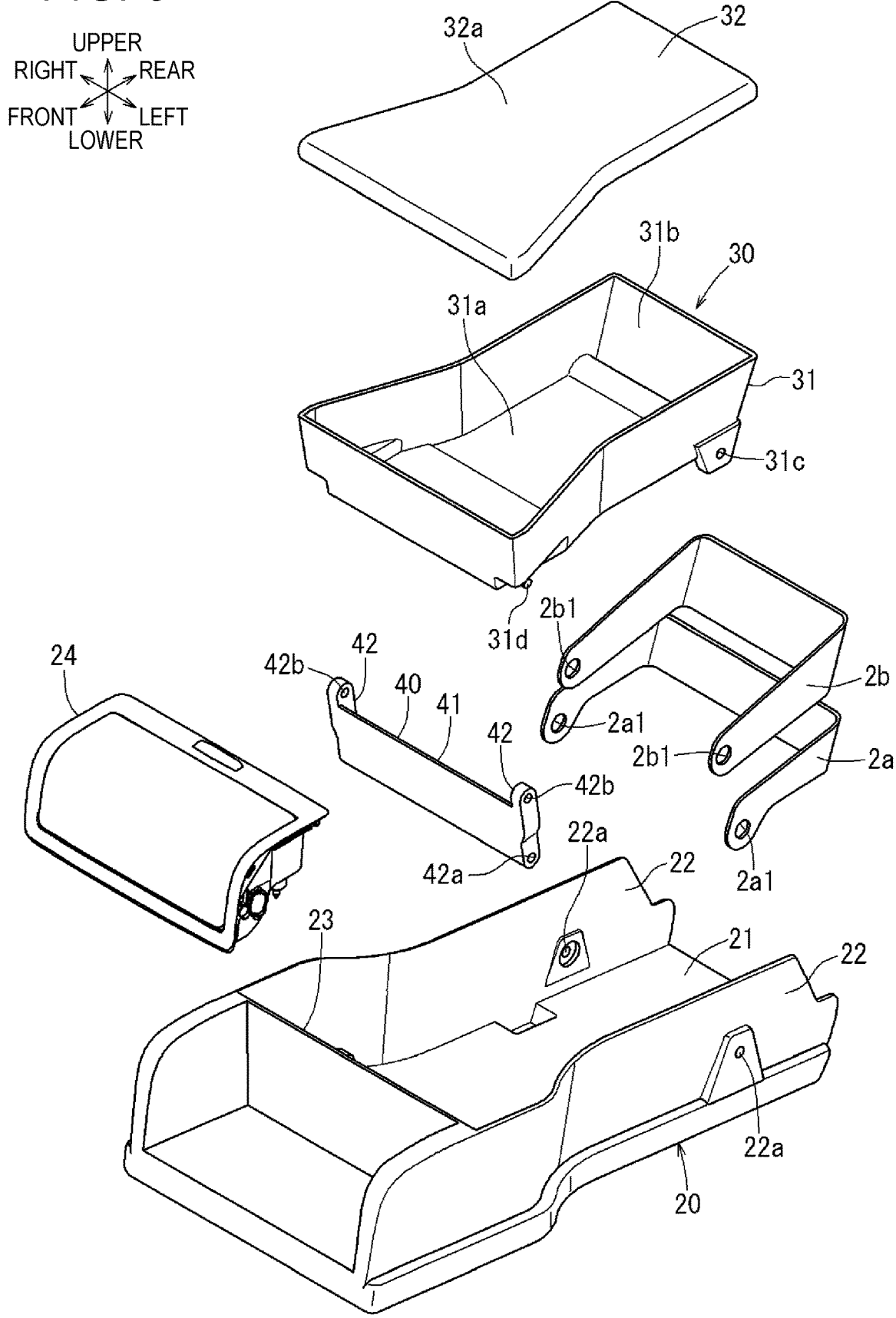
FIG. 5 is an exploded perspective view of the armrest according to the first embodiment.
Figure 6:
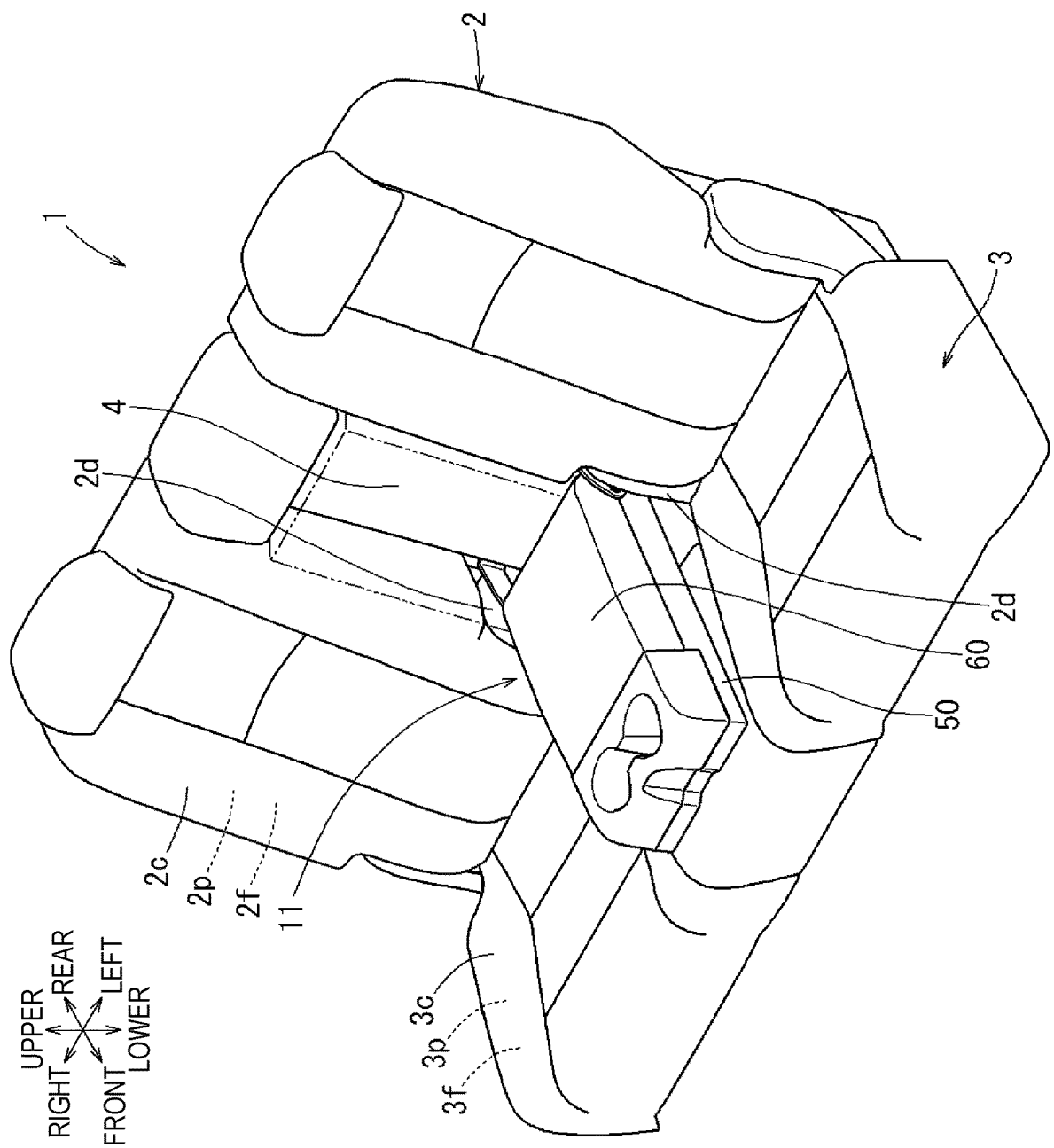
FIG. 6 is a perspective view of an automobile rear seat as viewed from an oblique front side, to which an armrest according to a second embodiment of the present disclosure is attached. A solid line indicates a state in which the armrest is in a use position, and a two-dot chain line indicates a state in which the armrest is in a storage position.

As illustrated in FIGS. 2 to 5, the lower armrest 20 includes, when the armrest 10 is in the use position, a plate-shaped base portion 21 that extends substantially horizontally, and a pair of left and right side wall portions 22 that extend upward from left and right end portions of the base portion 21. A cover member is provided on a lower surface side 21a of the base portion 21 by a cushion member, thereby improving the cushioning property and the appearance design. A front wall portion 23 extending vertically upward from the base portion 21 is provided on front end portion sides of the pair of left and right side wall portions 22 to couple the pair of left and right side wall portions 22. A cup holder unit 24 including a cup holder inside is provided between the pair of left and right side wall portions 22 in front of the front wall portion 23. Axial holes 22a penetrate corresponding rear end portions of the pair of left and right side wall portions 22 in the left-right direction, and share a common central axis extending in the left-right direction. As shown in FIG. 4, axial pins 22b are provided on the pair of the left and right side wall portion. The positions of the axial pins 22b are at middle portions between the axial holes 22a and front end portions of the pair of left and right side wall portions 22 in a front-rear direction. The axial pins 22b are close to the base portion 21 and extend in directions of approaching each other. Also, central axes extending in the left-right direction of the axial pins are common to each other. The central axis is a third rotation axis A3. The lower armrest 20 is supported on the back frame 2f of the seat back 2 via a first bracket 2a provided at a lower portion of the storage recess 4 of the seat back 2. The first bracket 2a is formed by a bent plate member and has a substantially U shape opened forward when viewed from above. The first bracket 2a has on its opening sides a pair of left and right axial holes 2a1 that share a common central axis extending in the left-right direction. The left and right axial holes 22a are respectively connected to the pair of left and right axial holes 2a1 by bolts and nuts (not illustrated) so that their central axes coincide with each other. Central axes of the left and right bolts and the left and right bolts nuts coincide with each other and extend in the left-right direction, which is a first rotation axis A1. When the lower armrest 20 rotates forward and backward relative to the seat back 2 about the first rotation axis A1 and is in the use position of the armrest 10, the lower surface side 21a abuts against a seat surface of the seat cushion 3 and the rotation is stopped. When the lower armrest 20 rotates forward and backward relative to the seat back 2 about the first rotation axis A1 and is in the storage position of the armrest 10 which is inserted into the storage recess 4 and whose rotation is stopped, the lower surface side 21a is continuous with a seat surface of the seat back 2 and constitutes a part of the seat surface. Here, a portion between the pair of left and right side wall portions 22 in front of the front wall portion 23 corresponds to "protruding portion" in the claims.

As illustrated in FIGS. 2 to 5, when the armrest 10 is in the use position, the upper armrest 30 extends substantially horizontally on the lower armrest 20. The upper armrest 30 includes a box-shaped main body 31 opened upward and having a substantially rectangular shape in which a longitudinal direction is the front-rear direction when viewed from above, and a lid portion 32 that is hinged at a rear end portion of the main body 31 and rotates in an upper-lower direction relative to the main body 31 to open and close. The main body 31 includes a substantially rectangular bottom surface portion 31a in which a longitudinal direction is the front-rear direction as viewed from above, and an upright plate portion 31b standing upward and substantially vertically relative to the bottom surface portion 31a from an outer peripheral edge portion of the bottom surface portion 31a. The main body 31 has, on left and right end portions on a rear end portion side of a lower surface of the bottom surface portion 31a, a pair of left and right axial holes 31c that penetrate the bottom surface portion 31a in the left-right direction and have a common central axis extending in the left-right direction. The main body 31 includes, on corresponding left and right end portions on a front end portion side of the lower surface of the bottom surface portion 31a, axial pins 31d that extend in directions of separating from each other and have a common central axis extending in the left-right direction. The central axis is a fourth rotation axis A4. The upper armrest 30 is supported on the back frame 2f of the seat back 2 via a second bracket 2b provided above the first bracket 2a in the storage recess 4 of the seat back 2. The second bracket 2b is formed by a bent plate member and has a substantially U shape opened forward when viewed from above. The second bracket 2b has on its opening sides a pair of left and right axial holes 2b1 that share a common central axis extending in the left-right direction. The pair of left and right axial holes 31c are respectively connected to the pair of left and right axial holes 2b1 by bolts and nuts (not illustrated) so that their central axes coincide with each other. Central axes of the left and right bolts and the left and right bolts nuts coincide with each other and extend in the left-right direction, which is a second rotation axis A2. A cover member is provided on an upper surface side 32a of the lip portion 32 by a cushion member, thereby improving the cushioning property and the appearance design.

As illustrated in FIGS. 2 to 5, the link member 40 includes, when the armrest 10 is in the use position, a rectangular plate-shaped base plate portion 41 when viewed from the front, and a pair of left and right side plate portions 42 extending vertically rearward relative to the base plate portion 41 from left and right end portions of the base plate portion 41. A pair of left and right axial holes 42a penetrate corresponding lower end portion sides of the pair of left and right side plate portions 42 in the left-right direction, and share a common central axis extending in the left-right direction. A pair of left and right axial holes 42b penetrate corresponding upper end portion sides of the pair of left and right side plate portions 42 in the left-right direction, and share a common central axis extending in the left-right direction. The link member 40 is rotatably connected to the lower armrest 20 about the third rotation axis A3 by inserting the left and right axial pins 22b into the left and right axial holes 42a. The link member 40 is rotatably connected to the upper armrest 30 about the fourth rotation axis A4 by inserting the axial pins 31d into the left and right axial holes 42b. In this manner, the seat back 2, the lower armrest 20, the upper armrest 30, and the link member 40 constitute a four-bar link.

Figure 2:
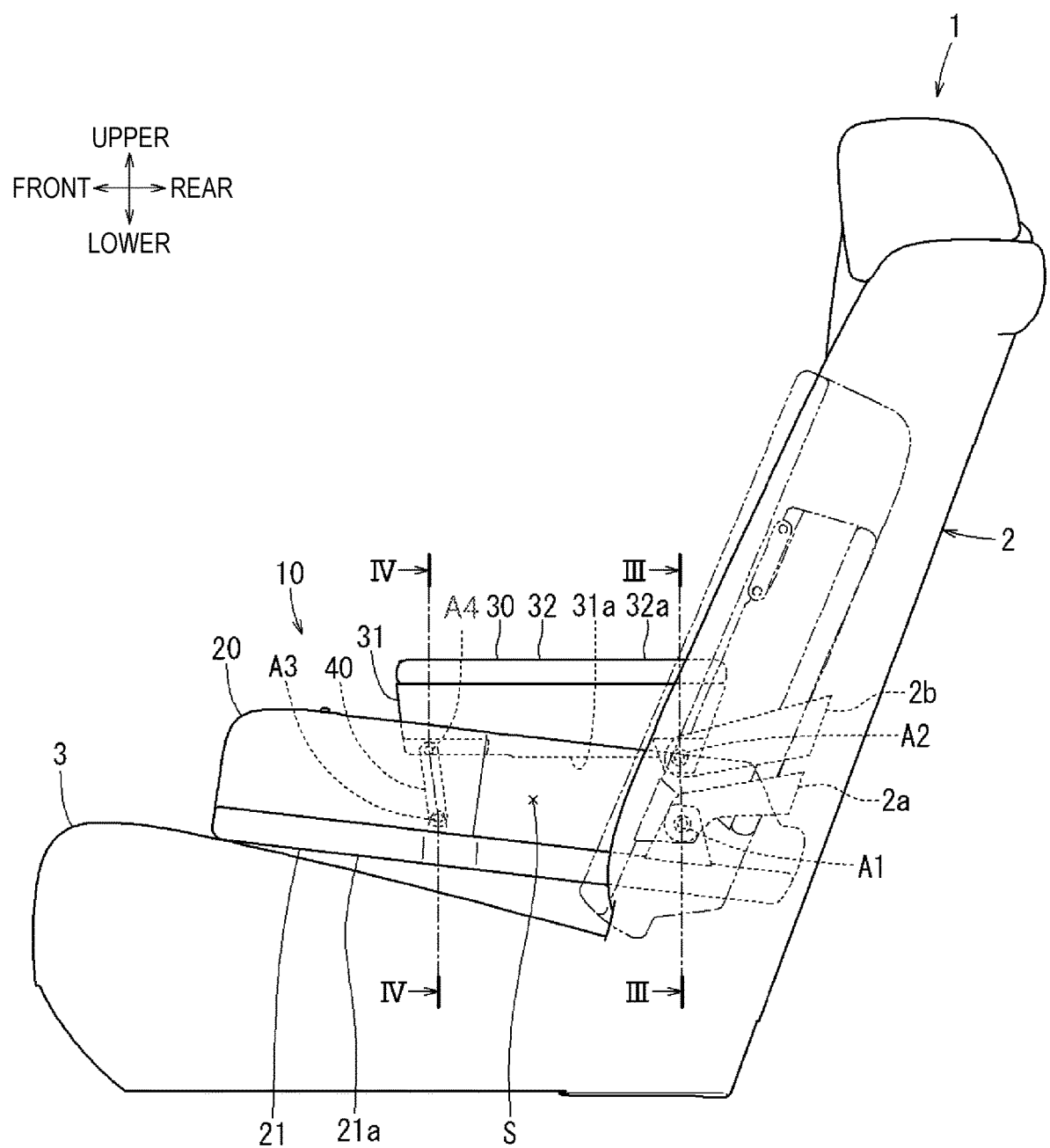
FIG. 2 is a side view of the automobile rear seat to which the armrest according to the first embodiment is attached. A solid line indicates the state in which the armrest is in the use position, and a two-dot chain line indicates the state in which the armrest is in the storage position.
Figure 3:
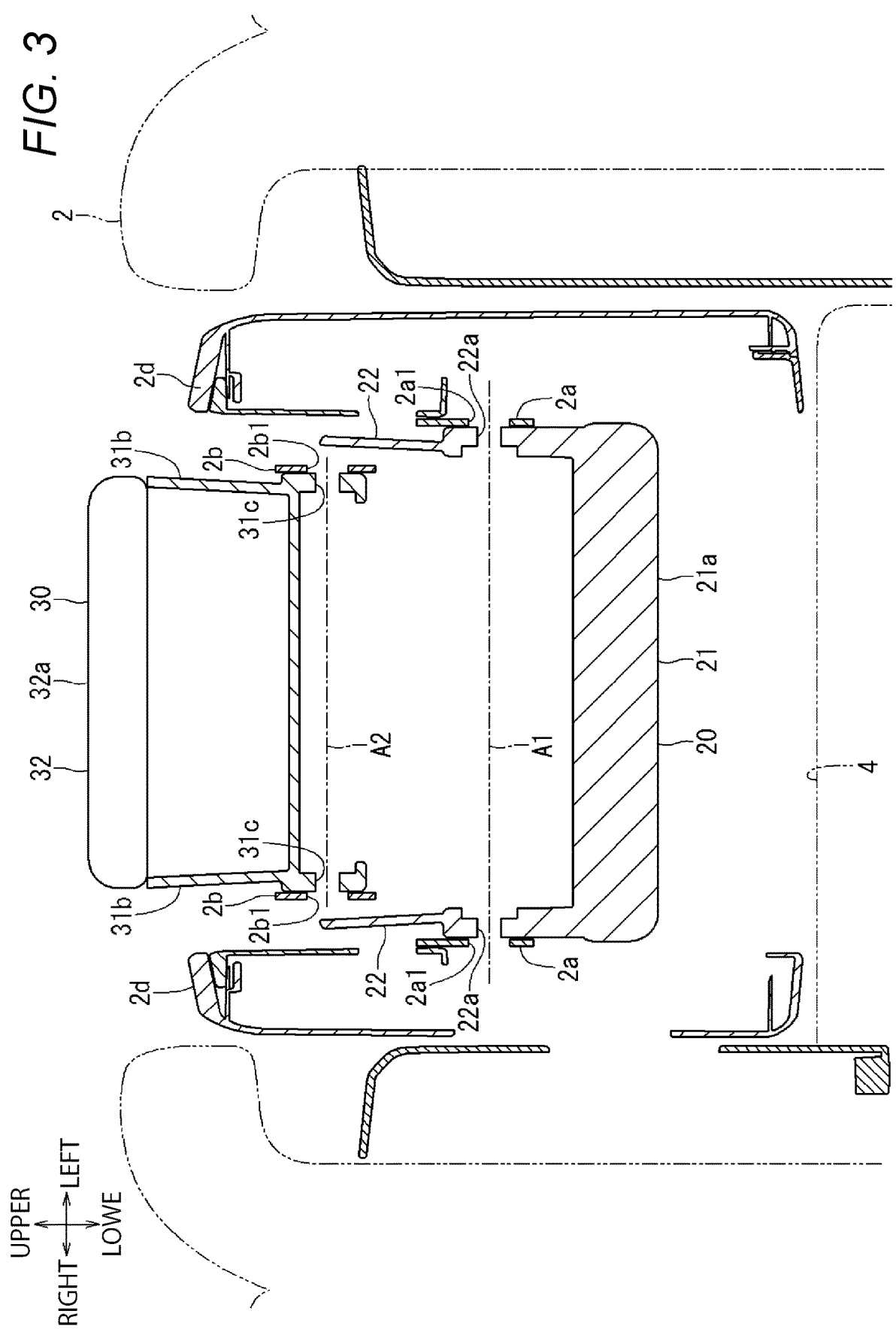
FIG. 3 is a sectional view taken along a line III-III in FIG. 2.

As indicated by a solid line in FIG. 2, when the armrest 10 is in the use position, the lower surface side 21a of the base portion 21 abuts against the seat surface of the seat cushion 3, the lower armrest 20 stops rotating, and the base portion 21 is in a substantially horizontal state. At this time, the link member 40 is in a substantially vertical state relative to the base portion 21 and supports a front end portion side of the upper armrest 30 in such a state, whereby the upper surface side 32a of the lid portion 32 of the upper armrest 30 is substantially horizontal at a height where an arm of a seated occupant is easily supported. That is, a space S is defined between the base portion 21 of the lower armrest 20 and the bottom surface portion 31a of the upper armrest 30, and accordingly, the height of the upper surface side 32a of the lid portion 32 can be disposed in an appropriate position without increasing the thickness of the armrest. When the armrest 10 is in the use position and the lid portion 32 is opened relative to the main body 31 of the upper armrest 30, a small object can be placed inside the main body 31. When the armrest 10 is in the use position, a lid of the cup holder unit 24 of the lower armrest 20 can be opened so that the cup holder can be used. When the lower armrest 20 is rotated to lift upward about the first rotation axis A1 from this state, the upper armrest 30 rotates to lift upward about the second rotation axis A2 while gradually approaching the base portion 21 of the lower armrest 20 by the action of the link member 40. Then, the armrest 10 is stored in the storage recess 4 in a state in which the bottom surface portion 31a of the upper armrest 30 faces an upper surface of the base portion 21 of the lower armrest 20 and the space S is substantially eliminated. At this time, the lower surface side 21a of the base portion 21 of the lower armrest 20 is continuous with the front surface of the seat back 2 and constitutes a seating surface. This state is the storage position of the armrest 10 and is indicated by a two-dot chain line in FIG. 2. The first bracket 2a and the second bracket 2b are hardly recognized visually from outside due to cover members 2d attached to left and right sides of the storage recess 4, thereby improving the appearance.

The present embodiment having the above configurations has the following effects. When the armrest 10 is in the storage position, the upper armrest 30 is close to the lower armrest 20 with the space S substantially eliminated. When the armrest 10 is in the use position, the upper armrest 30 is separated away from the lower armrest 20 and the space S is defined above the lower armrest 20, so that the upper surface side 32a of the lid portion 32 can be used as an armrest portion to implement the function of the armrest. In this manner, the armrest 10 can be compactly stored while maintaining the comfort of use and accordingly, the substantial volume of the entire armrest can be reduced and an increase in weight can be prevented.

The lower armrest 20 is connected to be rotatable forward and backward with the pair of left and right axial holes 2a1 taking the first rotation axis A1 as a center, and the upper armrest 30 is connected to be rotatable forward and backward with the pair of left and right axial holes 2b1 taking the second rotation axis A2 as a center. The link member 40 is rotatably connected to the pair of left and right axial pins 22b of the lower armrest 20 with the pair of left and right axial holes 42a taking the third rotation axis A3 as a center, and is rotatably connected to the pair of left and right axial pins 31d of the upper armrest 30 with the pair of left and right axial holes 42b taking the fourth rotation axis A4 as a center.

In this manner, the seat back 2, the lower armrest 20, the upper armrest 30, and the link member 40 constitute a four-bar link. Since this structure requires only the link member 40 in addition to the lower armrest 20 and the upper armrest 30, the upper armrest 30 can be interlocked to the lower armrest 20 with a simple structure.

FIGS. 6 to 10 illustrate a second embodiment of the present disclosure. The first armrest and a coupling structure of the second armrest relative to the seat back 2 are different from those in the first embodiment. The same configurations as those in the first embodiment are denoted by the same reference numerals in the drawing, and descriptions thereof are omitted. An armrest 11 includes a lower armrest 50, an upper armrest 60 provided on the lower armrest 50, and a link member 70 coupling the lower armrest 50 with the upper armrest 60. Here, the lower armrest 50, the upper armrest 60, and the link member 70 respectively correspond to "first armrest". "second armrest", and "second link member" in the claims.

As illustrated in FIGS. 6 to 10, the lower armrest 50 includes, when the armrest 11 is in a use position, a plate-shaped base portion 51 that extends substantially horizontally, and a cushion body 52 provided on a lower surface side of the base portion 51 and covered with a cover member that improves the cushioning property and the appearance design. The base portion 51 includes, on its upper surface, a pair of left and right front axial attachment portions 51a extending upward on a front end portion side, and a pair of left and right rear axial attachment portions 51b extending upward on a rear end portion side of the base portion 51. Axial holes 51a1 penetrate corresponding upper end portions of the pair of left and right front axial attachment portions 51a in a left-right direction, and share a common central axis extending in the left-right direction. The central axis is a fifth rotation axis A5 Axial holes 51b1 penetrate the pair of left and right rear axial attachment portions 51b in the left-right direction, and share a common central axis extending in the left-right direction. The central axis is the first rotation axis A1. The base portion 51 includes, on the upper surface, a lock portion 51d extending upward behind the pair of left and right front axial attachment portions 51a. The lock portion 51d fixes a cup holder 53 by locking a rear portion thereof without separation when the cup holder 53 is attached to an upper surface side of the base portion 51 and covers the pair of left and right front axial attachment portions 51a from above. The base portion 51 includes, on the upper surface side, a pair of left and right recesses 51c on right and left inner sides of the pair of left and right rear axial attachment portions 51b. The recesses 51c prevent lower end portion sides of the link member 70 from interfering with the base portion 51 when the link member 70 is attached to the base portion 51. The lower armrest 50 is supported on the back frame 2f of the seat back 2 via a third bracket 2e provided at a lower portion of the storage recess 4 of the seat back 2. The third bracket 2e is formed by a bent plate member and has a substantially U shape opened forward when viewed from above. The third bracket 2e has on its opening sides a pair of left and right axial holes 2e1 that share a common central axis extending in the left-right direction. The left and right axial holes 51b1 are respectively connected to the pair of left and right axial holes 2e1 by bolts B and nuts N so that their central axes coincide with each other. Central axes of the left and right bolts B and the left and right bolts nuts N coincide with each other and extend in the left-right direction, which is the first rotation axis A1. When the lower armrest 50 rotates forward and backward relative to the seat back 2 about the first rotation axis A1 and is in the use position of the armrest 11, a lower surface side of the cushion body 52 abuts against a seat surface of the seat cushion 3 and the rotation is stopped. When the lower armrest 50 rotates forward and backward relative to the seat back 2 about the first rotation axis A1 and is in a storage position of the armrest 11 which is inserted into the storage recess 4 and whose rotation is stopped, the lower surface side of the cushion body 52 is continuous with a seat surface of the seat back 2 and constitutes a part of the seat surface. The third bracket 2e includes stopper pins 2e2 in corresponding positions radially separated from the pair of left and right axial holes 2e1. The stopper pins 2e2 extend in directions of approaching each other and share a common central axis extending in the left-right direction. The stopper pins 2e2 have a function of stopping rotation of the link member 70 about the first rotation axis A1 in a predetermined position. Here, a portion in front of the lock portion 51d on the upper surface side of the base portion 51 corresponds to "protruding portion" in the claims.

As illustrated in FIGS. 6 to 10, when the armrest 11 is in the use position, the upper armrest 60 extends substantially horizontally on the lower armrest 50. The upper armrest 60 includes a box-shaped main body 61 opened downward and having a substantially rectangular shape in which a longitudinal direction is a front-rear direction when viewed from above, and a pair of left and right coupling portions 62 protruding forward from left and right end portion sides of a front end portion of the main body 61. The main body 61 includes, on its corresponding left and right inner sides, oval wall portions 61a extending in a substantially longitudinal direction in which elongated holes 61a1 are defined. The oval wall portions 61a extend in directions of approaching each other. Axial pins 72a of the link member 70 are slidable in the elongated holes 61a1. A cover member is provided on an upper surface side and lateral surface sides of the main body 61 by a cushion member, thereby improving the cushioning property and the appearance design. A pair of left and right axial holes 62a penetrate corresponding front end portion sides of the pair of left and right coupling portions 62 in the left-right direction, and share a common central axis extending in the left-right direction. The central axis is the fifth rotation axis A5. The upper armrest 60 is connected to the lower armrest 50 by bolts and nuts (not illustrated) so that the central axis of the pair of left and right axial holes 5a1 of the lower armrest 50 and the central axis of the pair of left and right axial holes 62a of the upper armrest 60 coincide with each other. Central axes of the left and right bolts and the left and right bolts nuts coincide with each other and extend in the left-right direction, which is the fifth rotation axis A5.

Figure 7:
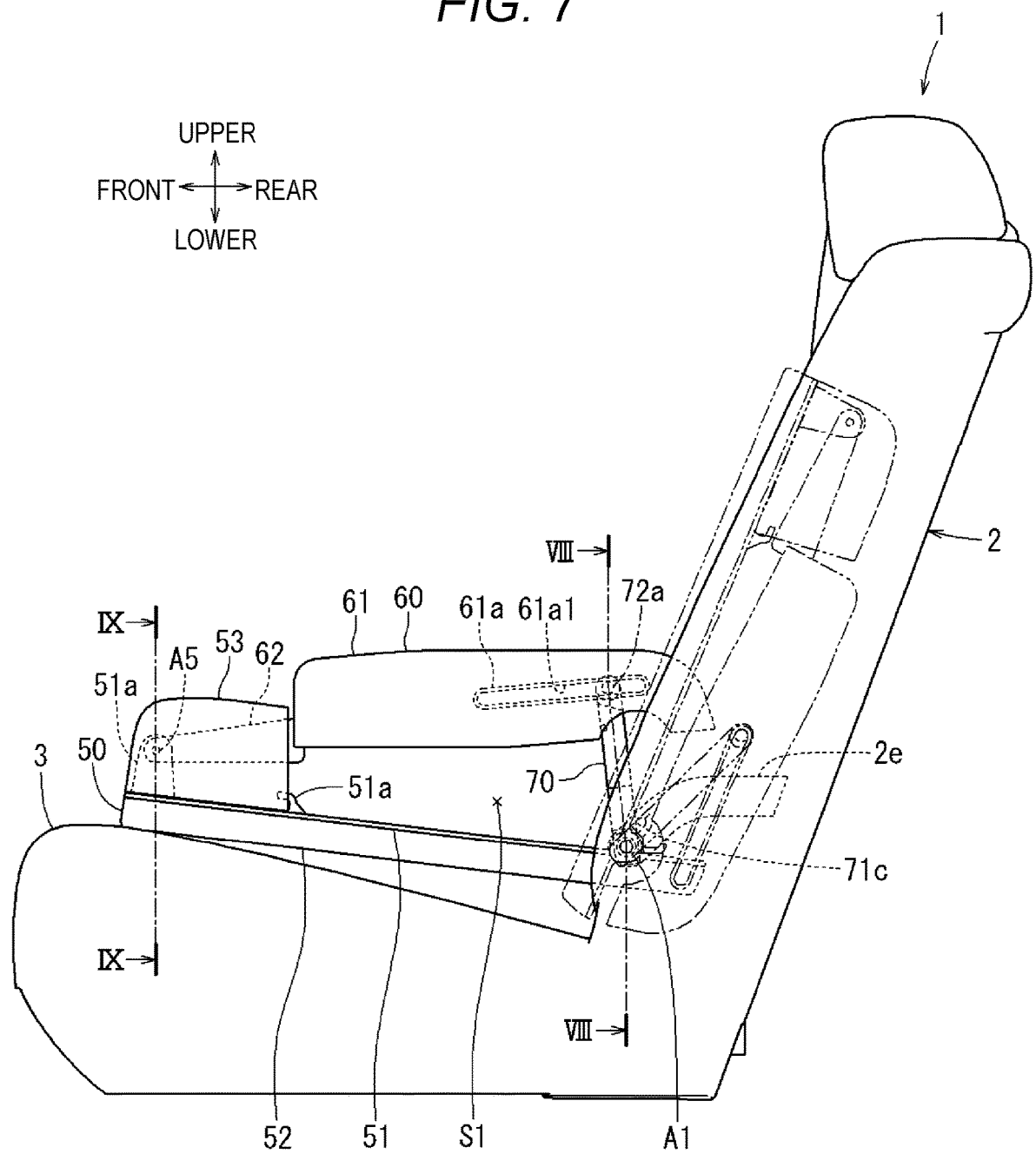
FIG. 7 is a side view of the automobile rear seat to which the armrest according to the second embodiment is attached. A solid line indicates the state in which the armrest is in the use position, and a two-dot chain line indicates the state in which the armrest is in the storage position.
Figure 8:
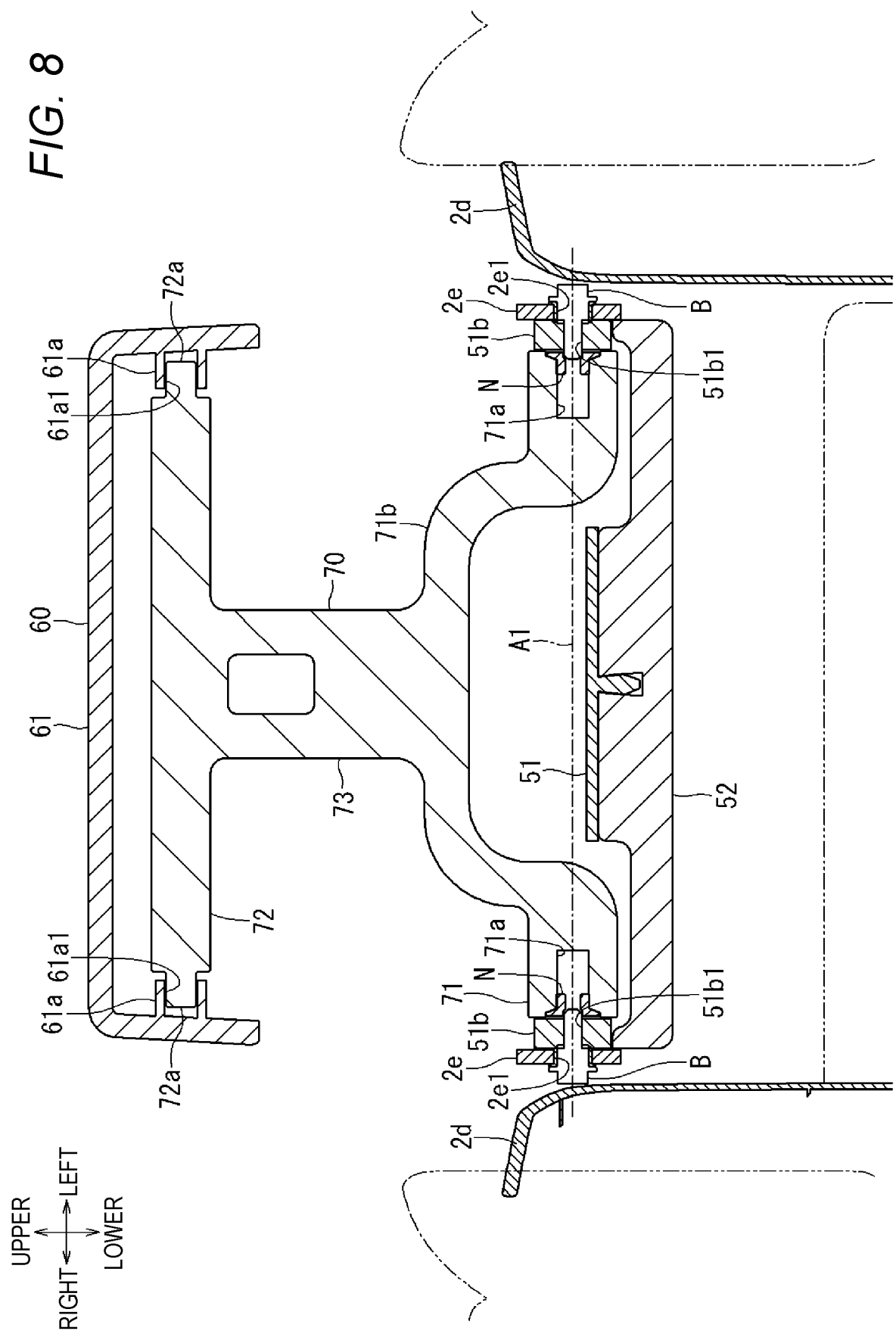
FIG. 8 is a sectional view taken along a line VIII-VIII in FIG. 7.
Figure 9:
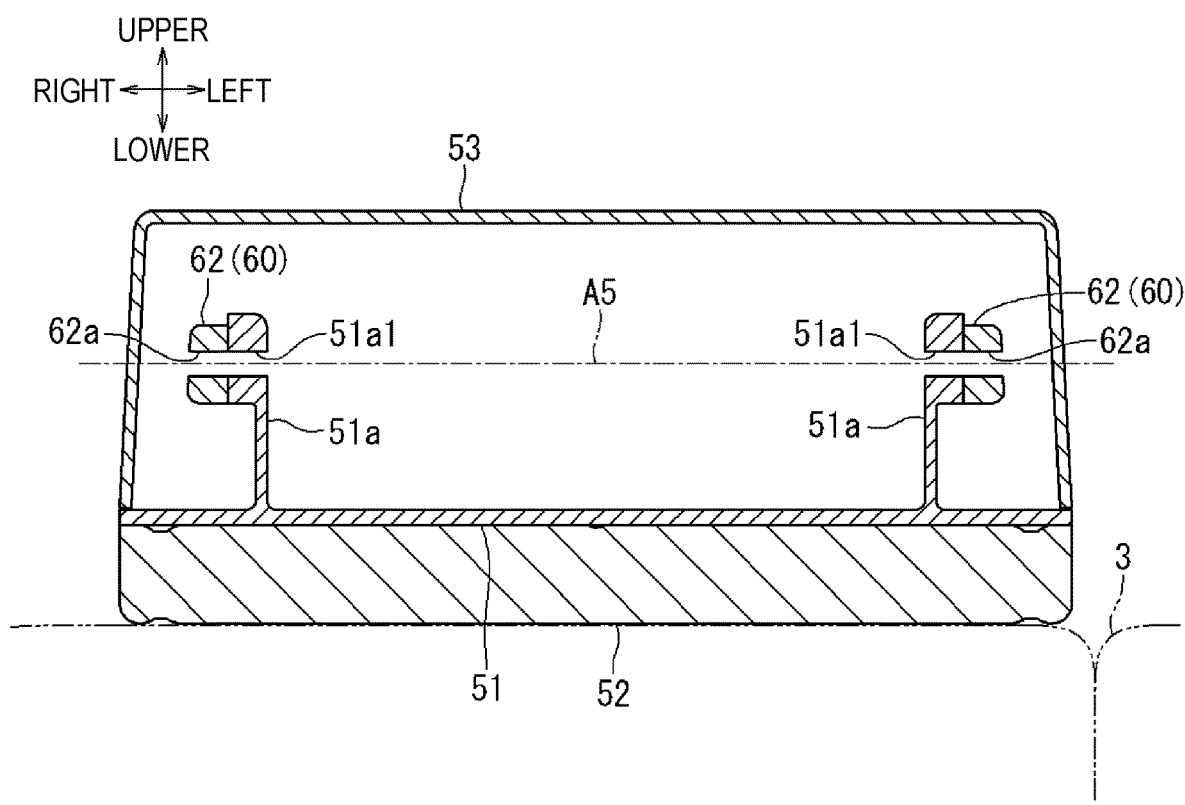
FIG. 9 is a sectional view taken along a line IX-IX in FIG. 7.
Figure 10:
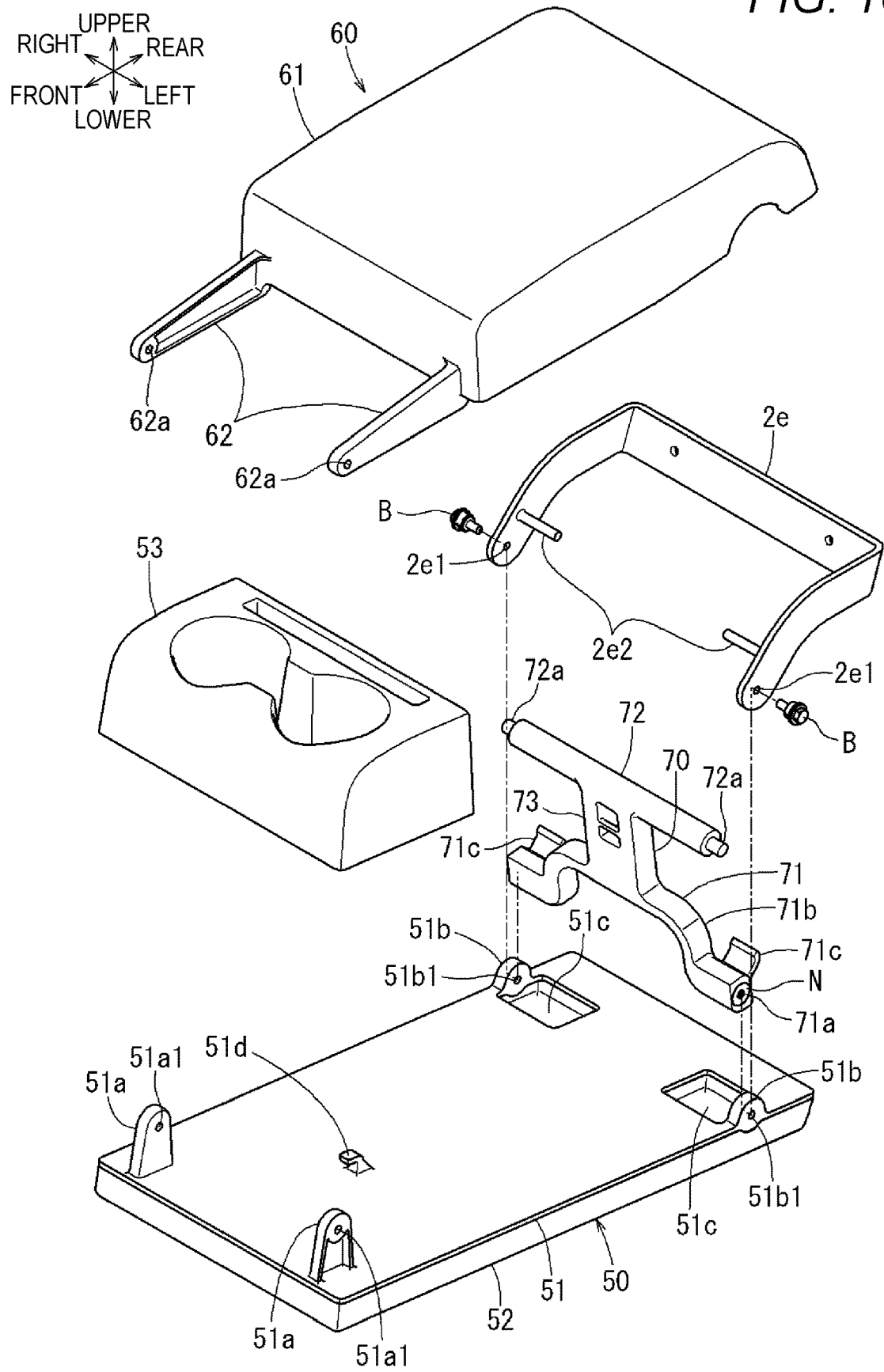
FIG. 10 is an exploded perspective view of the armrest according to the second embodiment.

As illustrated in FIGS. 6 to 10, when the armrest 11 is in the use position, the link member 70 is a member having a substantially H shape when viewed from front, and includes a lower arm portion 71, an upper arm portion 72, and a coupling portion 73 coupling the lower arm portion 71 and the upper arm portion 72. The lower arm portion 71 has a pair of left and right axial holes 71a sharing a common central axis at both left and right end portions, and includes curved portions 71b curved such that a central portion in the left-right direction of the lower arm portion 71 raises upward. The nuts N having a common central axis are attached to the pair of left and right axial holes 71a by insert molding. The central axis is the first rotation axis A1. The lower arm portion 71 includes, on left and right end portions, stopper portions 71c extending radially from the central axis of the axial holes 71a. When the link member 70 rotates about the first rotation axis A1, the stopper portions 71c abut against the stopper pins 2e2 of the third bracket 2e to restrict rotation of the link member 70. The upper arm portion 72 extends in the left-right direction and includes a pair of left and right axial pins 72a on left and right end portions. The pair of left and right axial pins 72a share a common central axis and extend in directions of being separated from each other. The link member 70 is connected to the third bracket 2e and the lower armrest 50 in such a manner that the central axis of the left and right axial holes 2e1, the central axis of the left and right axial holes 51b1, and the central axis of the left and right axial holes 71a coincide with each other and the bolts B are fastened to the nuts N. The link member 70 is rotatable about the first rotation axis A1, and is connected to the upper armrest 60 to be slidable in the elongated holes 61a1 by inserting the left and right axial pins 72a into the left and right elongated holes 61a1. In FIG. 7, the link member 70 is biased counterclockwise about the first rotation axis A1. The central portion in the left-right direction of the lower arm portion 71 and a central portion in the left-right direction of the upper arm portion 72 are connected by the coupling portion 73.

As indicated by a solid line in FIG. 7, when the armrest 11 is in the use position, the cushion body 52 abuts against the seat surface of the seat cushion 3, the lower armrest 50 stops rotating, and the cushion body 52 is in a substantially horizontal state. At this time, the link member 70 is in a substantially vertical state relative to the lower armrest 50 and supports a rear end portion side of the upper armrest 60 in such a state, whereby the upper surface side of the upper armrest 60 is substantially horizontal at a height where an arm of a seated occupant is easily supported. The pair of left and right axial pins 72a of the link member 70 are located near corresponding rear end portions of the left and right elongated holes 61a1. Front surfaces of the stopper portions 71c of the link member 70 abut against the stopper pins 2e2 of the third bracket 2e and are in a state in which further counterclockwise rotation about the first rotation axis A1 in FIG. 7 is stopped. That is, a space S1 is defined between the base portion 51 of the lower armrest 50 and the upper armrest 60, and accordingly, the height of the upper surface side of the upper armrest 60 can be disposed in an appropriate position without increasing the thickness of the armrest. When the armrest 11 is in the use position, the cup holder 53 of the lower armrest 50 can be used. When the lower armrest 50 is rotated to lift upward about the first rotation axis A1 from this state, the upper armrest 60 rotates about the fifth rotation axis A5 to gradually approach the base portion 51 of the lower armrest 50 by the action of the link member 70. Then, the armrest 11 is stored in the storage recess 4 in a state in which the upper armrest 60 faces an upper surface of the base portion 51 of the lower armrest 50 and the space S1 is substantially eliminated. At this time, the pair of left and right axial pins 72a are located near corresponding front end portions of the left and right elongated holes 61a1, and the lower surface side of the cushion body 52 of the lower armrest 50 is continuous with the front surface of the seat back 2 and constitutes a seating surface. This state is the storage position of the armrest 11 and is indicated by a two-dot chain line in FIG. 7. The third bracket 22 is hardly recognized visually from outside due to the cover members 2d attached to left and right sides of the storage recess 4, thereby improving the appearance.

The present embodiment having the above configurations has the following effects. When the armrest 11 is in the storage position, the upper armrest 60 is close to the lower armrest 50 with the space S1 substantially eliminated. When the armrest 11 is in the use position, the upper armrest 60 is separated away from the lower armrest 50 and the space S is defined above the lower armrest 50, so that the upper surface side of the upper armrest 60 can be used as an armrest portion to implement the function of the armrest. In this manner, the armrest 11 can be compactly stored while maintaining the comfort of use and accordingly, the substantial volume of the entire armrest can be reduced and an increase in weight can be prevented.

The lower armrest 50 is connected to be rotatable forward and backward with the pair of left and right axial holes 51b1 taking the first rotation axis A1 as a center, and the upper armrest 60 is connected rotatably to the lower armrest 50 with the pair of left and right axial holes 62a taking the fifth rotation axis A5 as a center. The link member 70 is connected to the third bracket 2e and the lower armrest 50 to be rotatable forward and backward with the pair of left and right axial holes 71a taking the first rotation axis A1 as a center. The left and right axial pins 72a are slidably inserted into the left and right elongated holes 61a1 of the upper armrest 60, respectively. In this manner, when the lower armrest 50 is rotated in the front-rear direction relative to the seat back 2, the upper armrest 60 moves toward or away from the lower armrest 50 by the action of the link member 70. Since this structure requires only the link member 70 in addition to the lower armrest 50 and the upper armrest 60, the upper armrest 60 can be interlocked to the lower armrest 50 with a simple structure.

Although specific embodiments have been described above, the present disclosure is not limited to appearances and configurations in the embodiments, and various modifications, additions, and deletions may be made without changing the spirit of the present disclosure. Examples thereof include the following matters.

1. Although the spaces S, S1 are not particularly used in the above embodiments, the spaces S, S1 can also be used as portions for small objects.

2. Although the present disclosure is applied to a seat of an automobile in the above embodiments, the present disclosure may also be applied to a seat mounted on a vehicle such as an airplane, a ship, or a train.

What is claimed is:

1. An armrest of a seat for a vehicle comprising:
a first armrest that is movable between a storage position where the first armrest constitutes a part of a seating surface of a seat back and a use position where the first armrest abuts against and is supported on a seating surface of a seat cushion, a rear end portion of the first armrest when the first armrest is in the use position being connected to a lower portion of the seat back to be rotatable forward and backward about a first rotation axis extending in a lateral direction of the seat; and
a second armrest that is connected to the first armrest to be interlocked with the first armrest, is adjacent to a rear side of the first armrest when the first armrest is in the storage position, and is separated upward from the first armrest in the use position, an upper surface of the second armrest serving as an armrest surface for a seated person that extends in a substantially horizontal direction in the use position,
wherein a front portion of the second armrest is pivotally connected to a front portion of the first armrest.

2. An armrest of a seat for a vehicle comprising:
a first armrest that is movable between a storage position where the first armrest constitutes a part of a seating surface of a seat back and a use position where the first armrest abuts against and is supported on a seating surface of a seat cushion, a rear end portion of the first armrest when the first armrest is in the use position being connected to a lower portion of the seat back to be rotatable forward and backward about a first rotation axis extending in a lateral direction of the seat; and a second armrest that is connected to the first armrest to be interlocked with the first armrest, is adjacent to a rear side of the first armrest when the first armrest is in the storage position, and is separated upward from the first armrest in the use position, an upper surface of the second armrest serving as an armrest surface for a seated person that extends in a substantially horizontal direction in the use position, wherein the second armrest is connected to the first armrest so that a rear end portion of the second armrest in the use position is rotatable forward and backward about a second rotation axis provided above the first rotation axis and extending in parallel to the first rotation axis, and wherein the armrest further comprises a first link member that has two end portions connected to the first armrest and the second armrest to be rotatable about a third rotation axis and a fourth rotation axis, the third rotation axis being provided on a front end portion of the first armrest in the use position and parallel to the first rotation axis, the fourth rotation axis being provided on a front end portion of the second armrest in the use position and parallel to the second rotation axis.

3. The armrest of the seat according to claim 2,
wherein the first armrest includes a protruding portion that protrudes and extends forward than a front end portion of the upper surface of the second armrest in the front-rear direction of the seat in a plan view of the vehicle when the first armrest is in the use position.

4. An armrest of a seat for a vehicle comprising:
a first armrest that is movable between a storage position where the first armrest constitutes a part of a seating surface of a seat back and a use position where the first armrest abuts against and is supported on a seating surface of a seat cushion, a rear end portion of the first armrest when the first armrest is in the use position being connected to a lower portion of the seat back to be rotatable forward and backward about a first rotation axis extending in a lateral direction of the seat; and a second armrest that is connected to the first armrest to be interlocked with the first armrest, is adjacent to a rear side of the first armrest when the first armrest is in the storage position, and is separated upward from the first armrest in the use position, an upper surface of the second armrest serving as an armrest surface for a seated person that extends in a substantially horizontal direction in the use position, wherein the second armrest is connected to the first armrest so that a front end portion of the second armrest in the use position is rotatable about a fifth rotation axis provided on a front end portion of the first armrest and extending in parallel to the first rotation axis, and wherein the armrest further comprises a second link member that has two end portions connected to the first armrest and the second armrest, one of the end portions being rotatably connected to the first rotation axis of the first armrest, the other of the end portions being slidably connected to an elongated hole provided on a rear end portion of the second armrest in the use position, the elongated hole extending substantially in a front-rear direction of the seat.

5. The armrest of the seat according to claim 4,
wherein the first armrest includes a protruding portion that protrudes and extends forward than a front end portion of the upper surface of the second armrest in the front-rear direction of the seat in a plan view of the vehicle when the first armrest is in the use position.

6. The armrest of the seat according to claim 3,
wherein a storage space is formed on the protruding portion.

7. The armrest of the seat according to claim 5,
wherein a storage space is formed on the protruding portion.

* * * * *